United States Patent
Burger et al.

(10) Patent No.: US 10,626,973 B2
(45) Date of Patent: Apr. 21, 2020

(54) DRIVE AND METHOD FOR OPERATING A DRIVE

(71) Applicant: WITTENSTEIN AG, Igersheim (DE)

(72) Inventors: Tobias Burger, Harthausen (DE); Rolf Hoffmann, Creglingen (DE); Philippe Isabey, Weikersheim (DE)

(73) Assignee: Wittenstein SE, Igersheim (DE)

( * ) Notice: Subject to any disclaimer, the term of this patent is extended or adjusted under 35 U.S.C. 154(b) by 325 days.

(21) Appl. No.: 15/094,106

(22) Filed: Apr. 8, 2016

(65) Prior Publication Data
US 2016/0298749 A1 Oct. 13, 2016

(30) Foreign Application Priority Data

Apr. 10, 2015 (DE) .................. 10 2015 105 526

(51) Int. Cl.
*F16H 49/00* (2006.01)
*H02P 6/14* (2016.01)
(Continued)

(52) U.S. Cl.
CPC ............ *F16H 49/001* (2013.01); *H02P 1/00* (2013.01); *H02P 1/46* (2013.01); *H02P 3/00* (2013.01);
(Continued)

(58) Field of Classification Search
CPC .... F16H 49/001; F16H 2049/003; H02P 1/00; H02P 1/46; H02P 21/00; H02P 27/04;
(Continued)

(56) References Cited

U.S. PATENT DOCUMENTS

| 4,798,104 A | * | 1/1989 | Chen ................... F16H 25/06 |
| | | | 475/159 |
| 5,631,511 A | * | 5/1997 | Schulmann ............ C30B 15/30 |
| | | | 310/83 |

(Continued)

FOREIGN PATENT DOCUMENTS

| DE | 102006009038 A1 | 8/2006 |
| DE | 102007011175 A1 | 9/2008 |

(Continued)

OTHER PUBLICATIONS

Chinese office action for patent application No. 201610219003.3 dated Oct. 9, 2019.

*Primary Examiner* — Victor L MacArthur
*Assistant Examiner* — Joseph Brown
(74) *Attorney, Agent, or Firm* — Bachman & LaPointe, PC

(57) ABSTRACT

Drive having a commutated electric motor (10), having a coaxial gearing (20) which is connected to the electric motor (10) and which comprises: an internal gear with an internal toothing (5); a tooth carrier (11) in which there are received a multiplicity of teeth (7) for engagement with the internal toothing, wherein the teeth are mounted so as to be radially displaceable relative to the tooth carrier (11) in the longitudinal direction of the teeth (7); a drive-input element with a profiling (22) for the radial drive of the radially displaceably mounted teeth (7), and having a gearing rotary encoder (30) which is connected to the drive output (25) of the gearing (20), wherein the gearing rotary encoder (30) is arranged and designed to detect a drive-output angular position and to output said drive-output angular position as a drive-output angle signal ($\delta$).

14 Claims, 4 Drawing Sheets

(51) Int. Cl.
*H02P 1/46* (2006.01)
*H02P 6/00* (2016.01)
*H02P 3/00* (2006.01)
*H02P 1/00* (2006.01)
*H02P 3/18* (2006.01)
*H02P 21/00* (2016.01)
*H02P 27/04* (2016.01)
*H02P 27/06* (2006.01)

(52) U.S. Cl.
CPC ............... *H02P 3/18* (2013.01); *H02P 6/00* (2013.01); *H02P 6/14* (2013.01); *H02P 21/00* (2013.01); *H02P 27/04* (2013.01); *H02P 27/06* (2013.01); *F16H 2049/003* (2013.01)

(58) Field of Classification Search
CPC .... H02P 27/06; H02P 3/00; H02P 3/18; H02P 6/00; H02P 6/14; H02K 7/116
USPC .......................................................... 318/15
See application file for complete search history.

(56) References Cited

U.S. PATENT DOCUMENTS

| | | | |
|---|---|---|---|
| 6,850,018 B2 | 2/2005 | Zacher et al. | |
| 7,304,450 B2* | 12/2007 | Prudham | F02D 11/10 318/700 |
| 7,375,487 B2 | 5/2008 | Miyashita et al. | |
| 7,733,052 B2* | 6/2010 | Loudot | H02P 25/092 318/701 |
| 8,256,327 B2 | 9/2012 | Schreiber | |
| 8,307,738 B2* | 11/2012 | Schmidt | F16H 25/06 74/640 |
| 8,480,528 B2* | 7/2013 | Wilhelm | F16H 25/06 475/162 |
| 9,893,658 B2* | 2/2018 | Winker | H02P 6/182 |
| 2003/0210004 A1 | 11/2003 | Zacher et al. | |
| 2006/0192517 A1 | 8/2006 | Miyashita et al. | |
| 2009/0211824 A1* | 8/2009 | Knoblauch | B60K 1/00 180/65.7 |
| 2010/0077882 A1* | 4/2010 | Schreiber | F16H 25/06 74/461 |
| 2010/0330216 A1* | 12/2010 | Hurt | B29B 9/065 425/67 |
| 2011/0005328 A1* | 1/2011 | Hayford | H02K 16/00 73/788 |
| 2011/0187355 A1* | 8/2011 | Dixon | G01D 5/145 324/207.25 |
| 2014/0262058 A1* | 9/2014 | Mullet | E06B 9/42 160/7 |
| 2016/0003316 A1* | 1/2016 | Poelzleithner | H02P 3/04 324/765.01 |

FOREIGN PATENT DOCUMENTS

| | | |
|---|---|---|
| DE | 102013211020 A1 | 12/2014 |
| EP | 1338775 A2 | 8/2003 |
| JP | 06265039 A | 9/1994 |

* cited by examiner

DRIVE AND METHOD FOR OPERATING A DRIVE

BACKGROUND OF THE INVENTION

The invention relates to a drive and to a method for operating a drive.

Drives having a commutated electric motor are known from the prior art. In EP 1 338 775 A2, a brushless, electronically commutated electric motor drives a gearing. The drive-output side of the gearing is in turn connected to a control element. From the attitude or position of the control element, an angular position at the drive output of the gearing can be derived. In turn, from the drive-output angular position, it is possible to roughly infer the rotor angular position of the electric motor, wherein possible gearing play, or the gearing rigidity, remains disregarded in the conventional solution.

It is an object of the invention to specify an improved drive or an improved method for operating a drive. In particular, it should be possible for the drive-output angular position to be detected as accurately as possible even in the case of high gearing transmission ratios or high gearing speed-reduction ratios.

SUMMARY OF THE INVENTION

The object is achieved by way of a drive according to the present invention. Advantageous refinements and embodiments will emerge from the subclaims and from this description.

One aspect of the invention relates to a drive having a commutated electric motor, having a coaxial gearing which is connected to the electric motor and which comprises an internal gear with an internal toothing, a tooth carrier in which there are received a multiplicity of teeth for engagement with the internal toothing, wherein the teeth are mounted so as to be radially displaceable relative to the tooth carrier in the longitudinal direction of the teeth, and a drive-input element with a profiling for the radial drive of the radially displaceably mounted teeth, wherein the drive furthermore has a gearing rotary encoder which is connected to the drive output of the gearing, wherein the gearing rotary encoder is arranged and designed to detect a drive-output angular position and to output said drive-output angular position as a drive-output angle signal.

A further aspect of the invention relates to a method for operating a typical drive, having the steps: detecting the drive-output angular position on the drive-output side of the gearing; calculating a calculated rotor angular position of the electric motor from the detected drive-output angular position and from a transmission ratio of the gearing; and providing a commutation signal for the electric motor using the calculated rotor angular position.

Typical embodiments offer the advantage that, while having a defined gearing transmission ratio or gearing speed-reduction ratio, the coaxial gearing is rigid and substantially free from play. It is therefore typically possible, from the detected drive-output angular position, to infer the rotor angular position of the electric motor with high accuracy.

The coaxial gearing used in the case of the invention normally comprises a drive-input element with a profiling and an internal gear with an internally situated toothing. The toothing is typically an encircling toothing. The toothing is engaged into by the multiplicity of teeth or the tooth tips of the teeth, wherein the teeth are typically mounted so as to be linearly radially displaceable relative to the tooth carrier. Here, "linearly radially" means, in the conventional sense, that a guide in a radial direction is provided, which guide permits only a movement of the tooth in the radial direction. Typically, by way of the guide, the tooth segment can be displaced linearly in precisely one direction. This may be achieved for example by virtue of the fact that the tooth has a uniform cross section over a particular length in the displacement direction, wherein the tooth carrier likewise has an opening for the tooth segment with a uniform cross section.

The teeth are normally mounted in the tooth carrier so as to be displaceable in each case in precisely one direction, typically in the direction of the longitudinal axis of the tooth. Furthermore, the rotational degree of freedom of the teeth relative to the tooth carrier about the longitudinal axis of the gearing is typically blocked.

At least a part of the teeth is typically of flexurally rigid design. Here, the expression "flexurally rigid" is typically to be understood in the technical sense, that is to say bending of the teeth is, owing to the rigidity of the material of the teeth, so slight as to be at least substantially insignificant with regard to the kinematics of the gearing. Flexurally rigid teeth comprise, in particular, teeth which are produced from a metal alloy, in particular steel or a titanium alloy, a nickel alloy or other alloys. Furthermore, it is also possible for flexurally rigid teeth composed of plastic to be provided, in particular in the case of gearings in which at least one of the following parts is likewise produced from plastic: toothing on an internal gear, tooth carrier and drive-input element.

The tooth carrier and the teeth are typically produced from a metal alloy, or additionally the toothing, or further additionally the drive-input element, are produced from a metal alloy. Such gearings offer the advantage of being extremely resistant to torsion and having an extremely high load capacity. Gearings composed of plastic have the advantage of having a low weight. The expression "flexurally rigid" refers in particular to flexural rigidity about a transverse axis of the tooth segment. This means in particular that, considering the tooth segment as a beam from a tooth root to a tooth tip, flexural rigidity exists which at least substantially prevents bending deformations between tooth tip and tooth root. Owing to the flexural rigidity, an extremely high load capacity and resistance to torsion of the gearing are achieved.

In typical embodiments, there is arranged between the tooth and the profiling a pivot segment, which is mounted on a rolling bearing arrangement which in turn lies against the profiling. Advantageous embodiments comprise a pivot segment which is arranged between the drive-input element with the profiling and in each case at least one tooth. The pivot segment allows the tooth to tilt relative to the profiling or relative to the pivot segment. It is typical for at least two teeth to be mounted on a pivot segment. Multiple teeth mounted on one pivot segment are typically arranged adjacent to one another in a row in an axial direction.

Typically, the tooth segment is loosely connected to the pivot segment. Here, a "loose connection" preferably means that the tooth segment is merely placed onto the pivot segment, normally placed thereon directly. Preferred pivot segments comprise a profile which prevents the tooth from slipping off the pivot segment, or prevents slippage of the pivot segment at least in one direction. It should be taken into consideration that the pivot segments are, in this way, held in their position in the rotational direction relative to the tooth carrier by the radially and linearly guided teeth. Such a profile may for example be a bead which engages into a depression. It is ensured in this way that the tooth segment does not slide over the pivot segment. It is achieved in this way that the pivot segment is fixed on the position of the tooth and a relative movement in a circumferential direction between tooth segment and pivot segment is prevented. Here, the profile is preferably arranged such that displaceability in a circumferential direction is blocked, such that slipping-off in a circumferential direction is prevented. In further embodiments, it is however also possible for spherical-cap-shaped, spherical or other elevations to be provided which prevent slippage of the pivot segments relative to the teeth.

Typical pivot segments make it possible to realize a segmented bearing arrangement. In typical embodiments, the pivot segments or other bearing segments, such as plates, form a segmented bearing arrangement. The segmented bearing arrangement offers the advantage that it can adapt to the profiling of the drive-input element and, furthermore, permits reliable force transmission in a radial direction.

The pivot segments preferably have edges, facing toward one another, with elevations and depressions, for example an undulating form or a serrated form. This offers the advantage that needle rollers which are arranged under the pivot segments are reliably held in the space between the pivot segments and the drive-input element even in the case of a relatively large spacing between the pivot segments.

The loose connection between the tooth segment and the pivot segment offers the advantage of simple construction. Here, a "loose connection" means in particular that the teeth are not prevented from lifting off from the pivot segments. A lift-off of the teeth from the pivot segments is, in the case of generic gearings, generally prevented by virtue of the fact that the teeth are guided at the tooth tips by the toothing.

Typical embodiments of the invention comprise a drive-input element with a profiling. The profiling preferably has a non-circular or non-ellipsoidal arcuate shape or curve. The non-circular or non-ellipsoidal arcuate shape offers the advantage that any desired profilings can be used, for example in order to set different transmission ratios. In the context of this application, eccentrics likewise fall under the definition of circular or ellipsoidal shapes, because in the case of eccentrics, it is merely the case that the axis of rotation does not correspond to the central axis of the circular shape, despite a circular shape nevertheless being present. In typical embodiments, the tooth carrier or the toothing is of circular form. This offers the advantage of a simple geometry for the tooth carrier and for the toothing. It is typically the case that the transmission of force on the slow side of the gearing takes place between the toothing and the tooth carrier. This offers the advantage that the travel for the force transmission is extremely short, such that extremely high rigidity can be achieved. Embodiments which satisfy said conditions include, but are not limited to: a gearing with internally situated cam disk as drive input and externally situated internal gear with toothing, wherein the tooth carrier is arranged between internal gear and cam disk; externally situated profiling on an internal gear for the drive of the radially movable teeth inward against a toothing, which is arranged on a toothed wheel or a toothed rack.

The toothing and the teeth typically have curved flanks. Examples of curvatures of the flanks are a cylindrical curvature or a curvature in the form of a logarithmic spiral. For a possible embodiment of a curvature in the form of a logarithmic spiral, reference is made to DE 10 2007 011 175 A1. The curved surface offers the advantage that the flanks that are in engagement make areal contact and not merely linear or punctiform contact. In this way, extremely high rigidity is realized in the transmission of force between the toothing and the teeth.

Typically, in embodiments, the pivot segments are movable relative to one another in a circumferential direction. This permits unconstrained guidance of the teeth and of the pivot segments. In this way, excessively high constraining forces in conjunction with a preload can be avoided. To achieve this mobility, the pivot segments may for example have a certain spacing between them.

In typical embodiments, the gearing rotary encoder is an optical encoder, for example an optical encoder with a coding disk with one or more Gray code stripes.

The gearing rotary encoder may also be a magnetic encoder, for example with a Hall sensor. The gearing rotary encoder may also be in the form of a capacitive rotary encoder or an inductive rotary encoder.

The gearing rotary encoder is typically an absolute value rotary encoder, for example a single-turn absolute value rotary encoder or a multi-turn absolute value rotary encoder.

The gearing rotary encoder typically has a resolution with a precision of 1° or better, preferably with a precision of 0.5° or better, even more preferably with a precision of 0.1° or better.

In typical embodiments, the drive is equipped with a commutation device for the electric motor, wherein the commutation device is designed to determine, from the drive-output angle signal, a calculated rotor angular position of the electric motor and to generate a commutation signal for the electric motor using the calculated rotor angular position.

The electric motor is typically a brushless three-phase current synchronous motor, often referred to as an EC motor. Typically, the rotor of the electric motor is permanently excited, normally by way of permanent magnets, and the stator of the electric motor has three-phase current windings, typically three three-phase current windings.

Typical embodiments offer the advantage that a rotary encoder for direct determination of the rotor angular position can be dispensed with. Often, drives are used in industrial environments, for example in industrial automation. There, technically demanding ambient conditions may prevail, for example high temperatures, high humidity etc. In typical embodiments, the rotor angular position is calculated from the detected drive-output angular position, typically using the known gearing transmission ratio or gearing speed-reduction ratio. Typically, the rotor angular position thus determined is highly accurate owing to the high gearing rigidity and/or the very small gearing play of the coaxial gearing, even in the case of high gearing transmission ratios or gearing speed-reduction ratios. Typically, the commutation device generates the commutation signal for the electric motor in a reliable and accurate manner from the calculated rotor angular position.

The commutation signal typically serves for applying a current which is dependent on the present rotor angular position to each of the three-phase current windings of the electric motor, such that the rotor of the electric motor rotates in the desired manner. In the case of a rotating rotor, the rotor angular position accordingly varies with time, such that the commutation signal is typically likewise generated so as to suitably vary with time.

The commutation signal may be a block-type commutation signal, typically a three-phase block-type commutation signal. In the case of a block-type commutation signal, switching of the respective activation signal of each of the three-phase current windings occurs at discrete rotor angular positions, for example at rotor angular positions of 60°, 120°, 180°, 240°, 300° and 360° ($\triangleq$ 0°). Typically, a transition of the rotor from one angular position sector into the subsequent angular position sector is used to determine the time of the switchover of the activation signal.

The commutation signal may also be a continuous (substantially sinusoidal) commutation signal, typically a three-phase commutation signal. A continuous commutation signal supplied to the three-phase current windings of the electric motor typically provides a magnetic field which rotates at the rotational speed of the electric motor. The rotor angular position typically exhibits higher resolution in the case of a continuous commutation signal being generated than in the case of a block-type commutation signal being generated. The rotor angular position is typically determined substantially continuously.

Typical embodiments offer the advantage that the accuracy with which the rotor angular position can be determined from the detected drive-output angular position is high. In this way, it is typically easily possible for a precise commutation signal, for example a block-type commutation signal or a continuous commutation signal, to be generated.

In typical embodiments, the gearing and the electric motor are connected to one another by way of a hollow shaft for the transmission of a drive torque of the electric motor. A hollow shaft can typically be utilized for the leadthrough of components, typically of signal lines or supply lines.

In typical embodiments, the gearing rotary encoder is arranged on the non-drive-output side of the electric motor. Typically, a shaft is connected to the drive output of the gearing, and the shaft is led through the hollow shaft, which serves for the transmission of the drive torque from the electric motor to the gearing. The gearing rotary encoder is then typically arranged on that end of the shaft which is not directly connected to the drive output of the gearing. Typically, the shaft is led out of the electric motor again on the non-drive-output side of said electric motor, that is to say the shaft extends through the electric motor.

Typical embodiments offer the advantage that the gearing rotary encoder is arranged on a side of the drive on which it is situated in a well-protected manner, for example so as to be well protected against environmental influences that may arise on the drive-output side. Typical embodiments offer the further advantage that the gearing rotary encoder is arranged on the non-drive-output side of the electric motor, such that it does not take up any structural space in the drive-output region.

In typical embodiments, the drive additionally has a motor rotary encoder which is connected, without a transmission ratio, to the electric motor. Typically, the motor rotary encoder is designed to determine the rotor angular position of the electric motor. The rigidity of the gearing is normally known. It is typically possible, from the known rigidity of the gearing, from the rotor angular position determined from the drive-output angular position, and from the rotor angular position determined by way of the motor rotary encoder, to calculate an angular position deviation value or angle of rotational offset.

In typical embodiments, the motor rotary encoder is an optical encoder, for example an optical encoder with a coding disk with one or more Gray code stripes.

The motor rotary encoder may also be a magnetic encoder, usually with a Hall sensor. The motor rotary encoder may also be in the form of a capacitive rotary encoder or an inductive rotary encoder.

The motor rotary encoder is typically an absolute value rotary encoder, for example a single-turn absolute value rotary encoder or a multi-turn absolute value rotary encoder.

In typical embodiments, the teeth of the gearing are guided in each case radially and/or linearly in the tooth carrier, and/or the rotational degree of freedom of the teeth relative to the tooth carrier about the longitudinal axis of the gearing is blocked. This is achieved for example by way of a linear guide of the teeth in a radial direction in the tooth carrier. In this way, the teeth rotate with the tooth carrier about the longitudinal axis of the gearing, but not relative to the tooth carrier.

In typical embodiments, the drive-input element furthermore comprises a cam disk. Typically, the cam disk increases the gearing rigidity and ensures a high transmission ratio.

In typical embodiments of the method according to the invention, the commutation signal comprises a setpoint torque signal, and the method has the steps of determining an estimated angular position deviation value between the calculated rotor angular position and an estimated rotor angular position from the setpoint torque signal and from the rigidity of the gearing; of determining a corrective signal for the rotor angular position from the deviation value; and of superposing the corrective signal on the commutation signal.

The corrective signal is typically determined without an additional rotary encoder, that is to say using only the gearing rotary encoder, the setpoint torque signal and the rigidity of the gearing. With a superposed corrective signal, it is typically possible to reduce the influence of the rigidity of the gearing and of the load torque (of the drive-output-side torque) on the rotor angular position. Typically, precise commutation is possible even under high load (in the presence of high drive-output-side torques).

In typical embodiments, the method has the steps of measuring a back-EMF at an exciter coil of the electric motor; of estimating an estimated rotor angular position of the electric motor from the back-EMF; of determining an angular position deviation value between the calculated rotor angular position and the estimated rotor angular position; and of determining a drive output torque from the rotational angle position deviation value and from the rigidity of the gearing.

Typically, a drive output torque can be provided without a torque sensor additionally being required.

BRIEF DESCRIPTION OF THE DRAWINGS

The invention will be discussed in more detail on the basis of the appended drawings, wherein, in the Figures.

DETAILED DESCRIPTION

Below, typical embodiments of the invention will be described on the basis of the Figures, wherein the invention is not restricted to the exemplary embodiments; the scope of the invention is rather defined by the claims. In the description of the embodiment, in some cases, the same reference designations have been used for identical or similar parts in different Figures and for different embodiments in order to make the description clearer. This however does not mean that corresponding parts of the invention are restricted to the variants illustrated in the embodiments.

Figure 1:
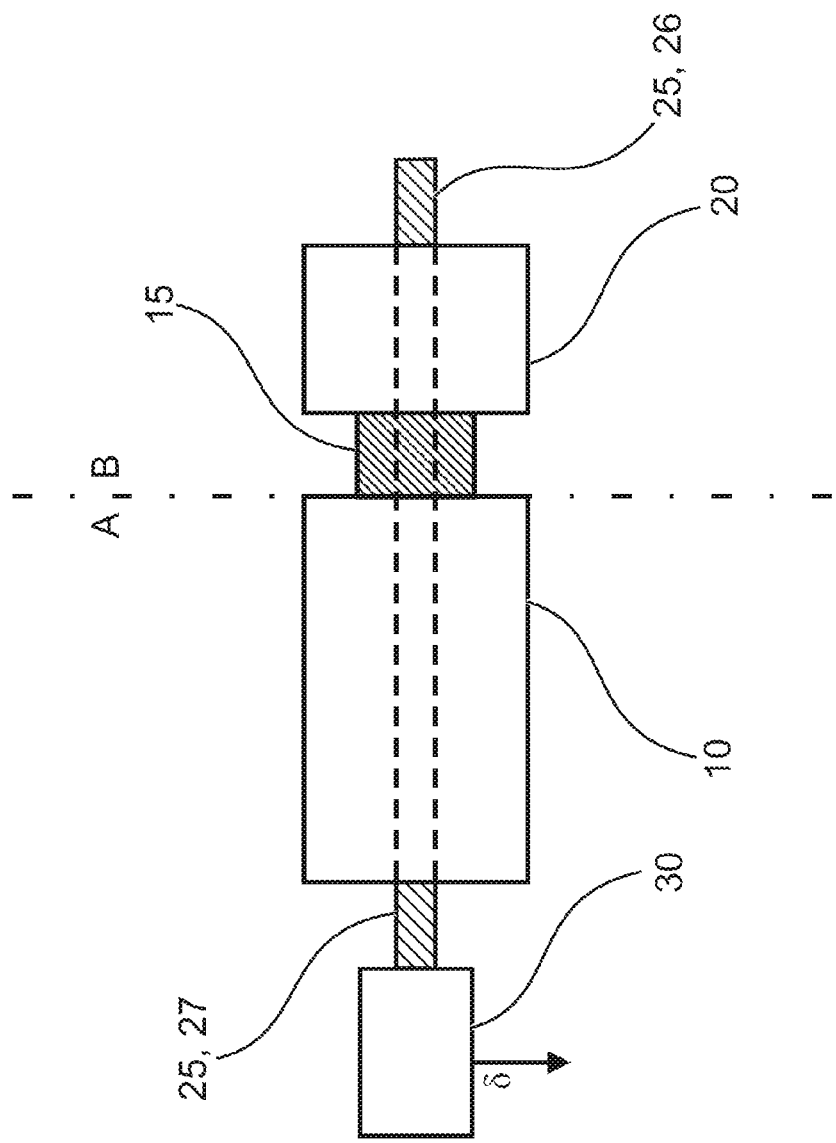
FIG. 1 shows a schematic view of a drive according to an embodiment of the invention.

FIG. 1 shows an embodiment of a drive according to the invention in a schematic view. The drive is, in the embodiment, used for regulating the position of a control element.

An electric motor 10 is, in the embodiment, in the form of a commutated, brushless three-phase current synchronous motor. The electric motor 10 is connected by way of a hollow shaft 15 to the drive-input side of a coaxial gearing 20 and is designed to drive the gearing 20 by way of a torque transmitted via the hollow shaft.

For a better overview, in FIG. 1, the drive-output side of the electric motor 10 is denoted by the letter "B", and the non-drive-output side of the electric motor 10 is correspondingly denoted by the letter "A". The drive-output side "B" and the non-drive-output side "A" are separated in the illustration by a dash-dotted line.

Figure 4:
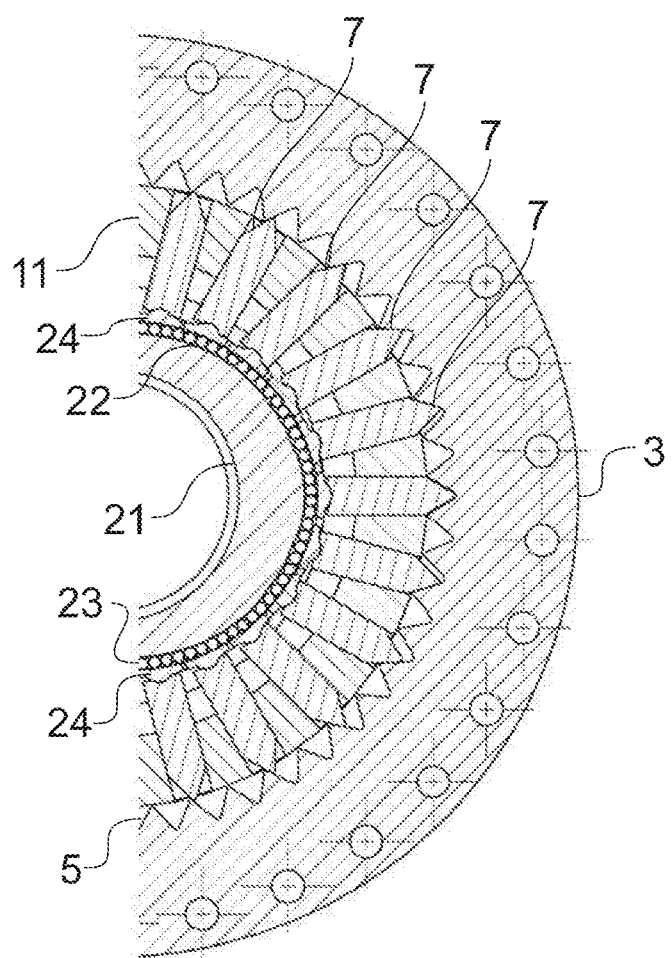
FIG. 4 shows a halved sectional view of the gearing of the drive as per the embodiment.

The gearing 20, which will be discussed in more detail further below with reference to FIG. 4, is in the form of a rigid and substantially play-free coaxial gearing, and has a known transmission ratio and a known gearing rigidity. For example, the gearing 20 has a transmission ratio of approximately 30:1; it is however also possible for the gearing 20 to have, for example, a transmission ratio of 300:1. Said values are to be understood as illustrative and not limiting; they are rather intended to illustrate the large range of possible gearing transmission ratios in which the invention can be used.

At the output of the gearing 20, that is to say on the drive-output side of the gearing 20, there is provided a drive-output shaft 25 which protrudes by way of its front end 26 out of the gearing 20 and, for example, drives a load (not illustrated).

The drive-output shaft 25 is furthermore elongated in the direction of the non-drive-output side A of the electric motor and led through the hollow shaft 15 and the electric motor 10, so as to protrude by way of its rear end 27 out of the electric motor 10 on the non-drive-output side A.

On the rear end 27 of the drive-output shaft there is arranged a gearing rotary encoder 30. The gearing rotary encoder 30 is, in the embodiment illustrated, in the form of an optical absolute value encoder and has a resolution precision of better than 0.1°. The gearing rotary encoder 30 is designed to detect the angular position of the drive-output shaft 25 and output said angular position as a drive-output angle signal δ.

With reference to the schematic illustration of a regulation system in FIG. 2, it will now be discussed, by way of an example, how the drive-output angle signal δ can be used according to the invention.

Figure 2:
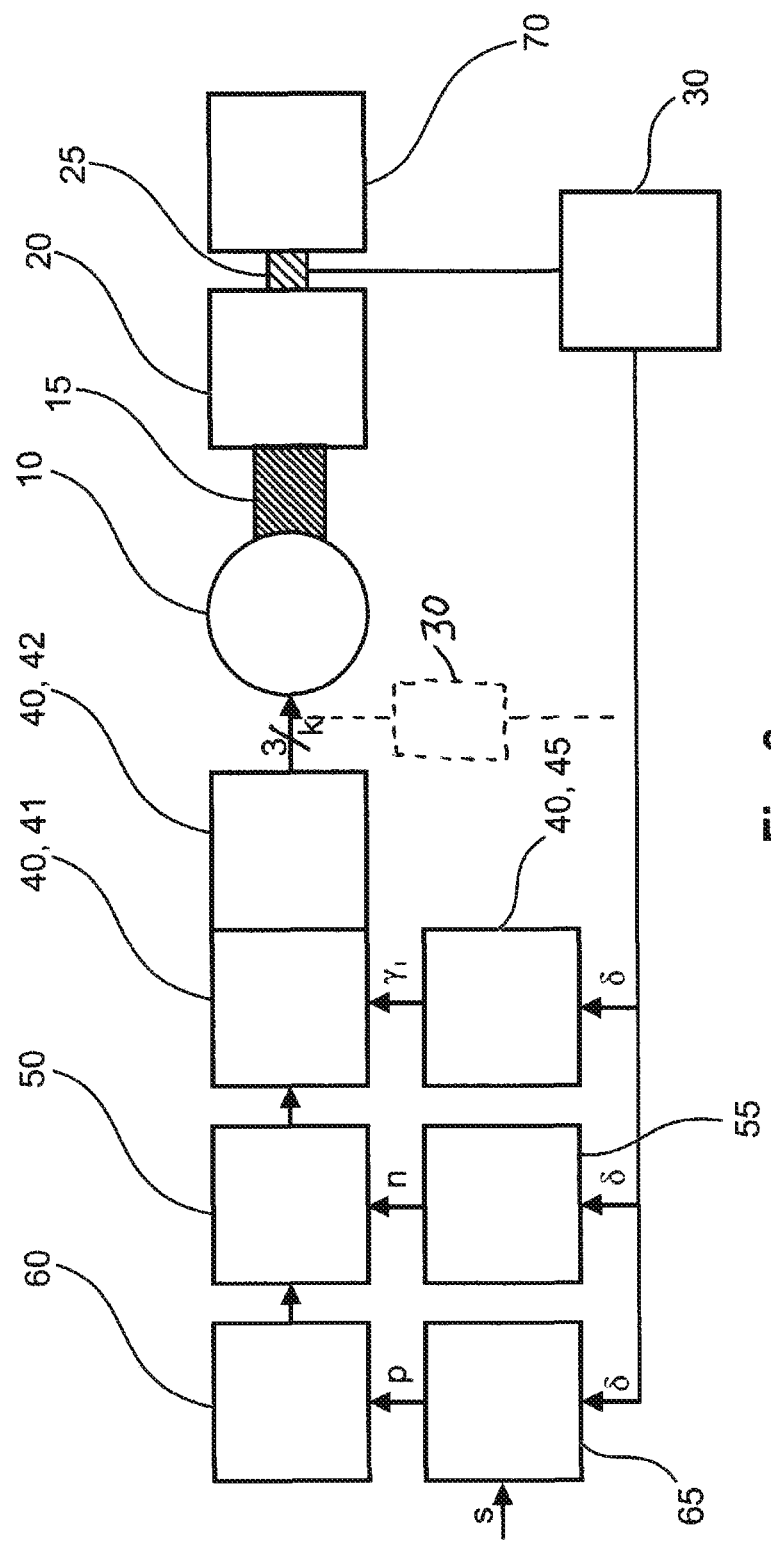
FIG. 2 shows a schematic view of a regulation system for the drive as per the embodiment.

The electric motor 10, the hollow shaft 15, the coaxial gearing 20 and the drive-output shaft 25 are illustrated again on the right-hand side of the illustration in FIG. 2. A schematically illustrated load 70 is acted on with a torque by the drive-output shaft 25. To simplify the illustration, the gearing rotary encoder 30 is illustrated in FIG. 2 as detecting the drive-output angular position on the drive-output shaft 25 in the vicinity of the load 70; it is however possible, as discussed above in conjunction with FIG. 1, for the gearing rotary encoder 30 to again be arranged on the non-drive-output side of the electric motor 10 as also shown in dashed lines is FIG. 2.

In the embodiment illustrated, the electric motor 10 is in the form of a three-phase current synchronous motor, and has a three-phase commutation signal k applied thereto. In the embodiment, said commutation signal k is a block-type commutation signal and must be generated suitably for each of the three phases in a manner dependent on the present rotor angular position.

For this purpose, according to the embodiment, a commutation device 40 is provided which generates the commutation signal k electronically. The commutation device 40 has a current regulator 41, a power amplifier 42 and a commutation conversion device 45.

The commutation conversion device 45 has supplied to it the drive-output angle signal δ from the gearing rotary encoder. Using the known gearing rigidity of the gearing 20 and the known transmission ratio thereof, said commutation conversion device determines a rotor angle signal $\gamma_1$, which indicates the calculated rotor angular position of the rotor of the electric motor 10, from the drive-output angle signal δ. Said rotor angle signal $\gamma_1$ is supplied to the current regulator 41, which generates the commutation signal k by way of the power amplifier.

Furthermore, from the drive-output angle signal δ, a rotational speed conversion device 55 determines the rotational speed of the rotor of the electric motor 10 and supplies this to a rotational speed regulator. In a similar manner, a position conversion device 65 determines a position signal p from the drive-output angle signal δ and a position sensor signal s (a reference signal). Said position signal p is supplied to a position regulator 60.

The position regulator 60, the rotational speed regulator 50 and the current regulator 41 of the commutation device 40 are interconnected in a regulator cascade. The regulator cascade has supplied to it, for example, a position setpoint value for the position of the control element.

In the embodiment, it is possible, according to the invention, to dispense with an additional rotary encoder on the drive-output side B. The gearing rotary encoder 30 may however in turn—as shown in the embodiment—be arranged on the non-drive-output side A, where it is generally less exposed to the potentially damaging process influences that may exist on the drive-output side B. Furthermore, precise motor commutation of the electric motor 10 is possible without the need to provide an additional motor rotary encoder. Precise position regulation of the position of the control element is possible without the need to provide an additional rotary encoder.

The regulation system shown in FIG. 2 is to be understood merely as an example. It is likewise possible, instead of the position regulation, to also provide rotational speed regulation or holding regulation. Furthermore, torque regulation may be realized, for example by way of follow-up current regulation in the case of a setpoint current value being predefined.

Figure 3:
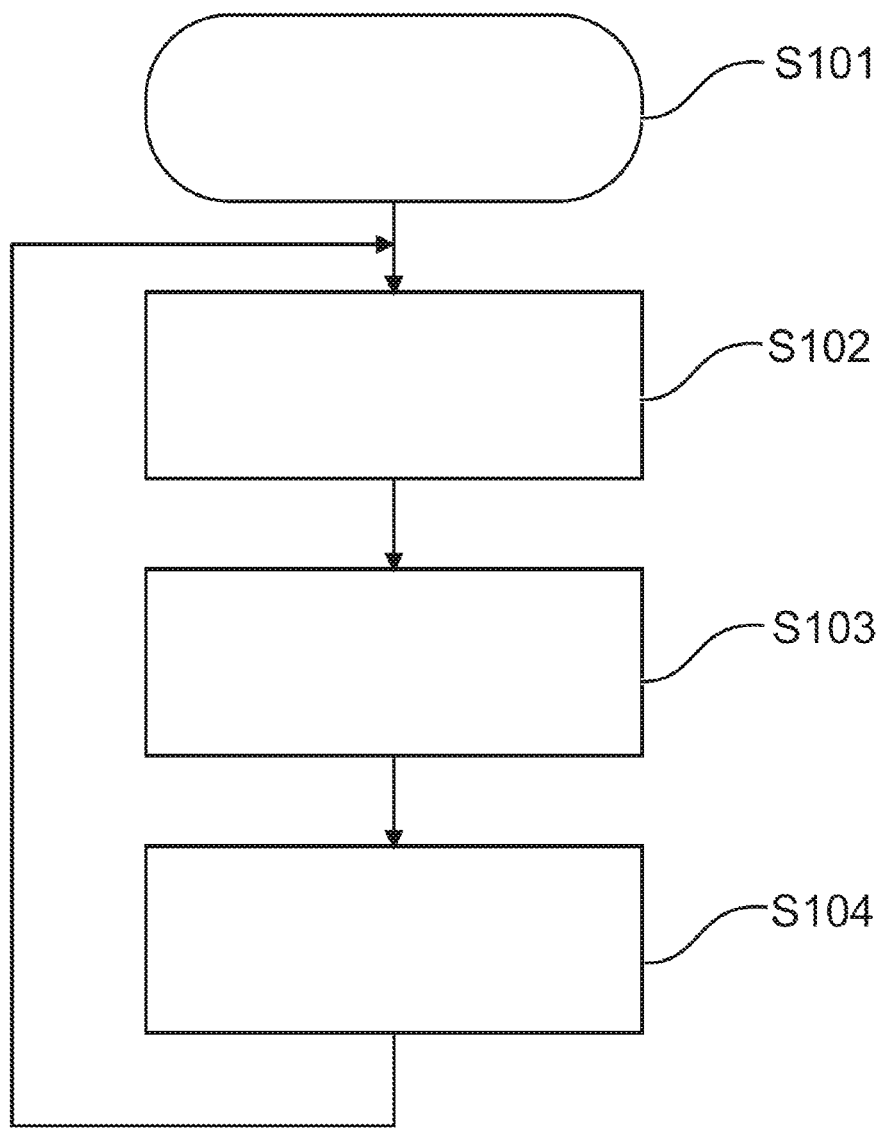
FIG. 3 shows a flow diagram of a method for operating the drive as per the embodiment.

With reference to the flow diagram in FIG. 3, a method for operating a drive will now be discussed. The process begins in step S101. Subsequently, in step S102, it is firstly the case that the drive-output angular position on the drive-output side of the gearing 20 is detected. In the subsequent step S103, a rotor angular position of the electric motor 10 is calculated from the detected drive-output angular position and from a transmission ratio of the gearing 20. In the subsequent step S104, a commutation signal k for the electric motor 10 is then provided using the calculated rotor angular position. The process subsequently jumps back to step S102, such that the commutation signal k is generated repeatedly at intervals.

Finally, FIG. 4 shows, in a halved sectional view, a gearing 20 that is used in the drive as per the embodiment. The gearing 20 has an internal gear 3 with an internally situated encircling toothing 5. A second half of the gearing 20 is, in section, of analogous construction to the section illustrated. Teeth 7 engage into the toothing 5. For better clarity, not every tooth segment 7 in FIG. 4 is also denoted by the reference designation 7. The teeth 7 are mounted in radially displaceable fashion in a tooth carrier 11. For this purpose, the tooth carrier 11 has radially oriented, duct-like circular or slot-shaped openings which ensure radial guidance of the teeth 7 in the tooth carrier 11. Owing to the radial guidance in the openings, the teeth 7 are capable of moving only in a radial direction along their longitudinal axis; in particular, a rotation relative to the tooth carrier 11 about a longitudinal axis of the gearing 20 is prevented.

The longitudinal axis of the teeth typically refers to the axis running from the tooth root to the tooth tip, whereas the longitudinal axis of the gearing points in the direction of the axis of rotation of the gearing. This may for example be the axis of rotation of the tooth carrier that can be used as drive output, or else the axis of rotation of a cam disk.

The teeth 7 are driven by a drive-input element which comprises a hollow cam disk 21. The cam disk 21 has a profiling 22 for driving the teeth 7 in the radial direction. A course of the profiling 22 has two elevations over the circumference, such that respectively oppositely situated teeth 7 are engaged into tooth spaces of the toothing 5 to the furthest extent.

In the gearing 1 illustrated in FIG. 4, the teeth 7 are arranged, with a rolling bearing, on the profiling of the drive-input element. The rolling bearing comprises rolling bodies 23 which, in this exemplary embodiment, are in the form of needle rollers.

The gearing 20 comprises a segmented bearing arrangement for the teeth 7. The segmented bearing arrangement comprises pivot segments 24 which each have, on the side facing toward the tooth 7, a rounded tooth bearing surface which forms a bead on which the root of a tooth 7 may be arranged. The bead, together with a corresponding recess in the tooth root of the respective tooth 7, prevents slippage of the tooth 7 on the pivot segment 24.

The beads serve in each case to form root joints for the teeth 7, such that the teeth 7 can tilt relative to the pivot segments 24 in order to ensure unconstrained guidance. The pivot segments 24 are displaceable relative to one another in a direction of rotation, such that the spacings between the pivot segments 24 can be varied. In this way, the degree of freedom in the direction of rotation of the pivot segments 24 is also not blocked. This permits substantially unconstrained guidance and substantially unconstrained radial drive of the pivot segments 24 by the profiling 22 of the cam disk 21. To minimize the friction resistance between the profiling 22 and the pivot segments 24, the rolling bodies 23 are provided as needle rollers.

The teeth 7 are designed so as to be braced between the drive-input element and the toothing 5 of the internal gear 21 with the cooperation of the guide through the tooth carrier 11. This is achieved by virtue of the teeth 7 having an oversize of 0.01% of the diameter of the toothing 5. The teeth 7 are therefore designed to be of such a length as to be received in the gearing 20 with a preload. This yields an internal preload of the gearing 20. The gearing 20 is thus of highly rigid construction. In this way, in turn, the rotor angular position can be inferred in a precise manner from the drive-output angular position δ, such that precise and reliable commutation of the electric motor 10 is made possible.

The invention is not restricted to the embodiment described above; rather, the scope of the invention is defined by the appended claims.

The invention claimed is:

1. A drive, comprising:
a commutated electric motor (10) having a drive-output side (B), a non-drive-output side (A) and a hollow shaft (15) at the drive-output side (B), the hollow shaft (15) being driven by the motor (10);
a coaxial gearing (20) which is driven by the hollow shaft (15), the coaxial gearing (20) comprising:
an internal gear (3) with an internal toothing (5);
a tooth carrier (11);
a multiplicity of teeth (7) received within the tooth carrier (11) and radially displaceable relative to the tooth carrier (11) in a longitudinal direction of the teeth (7) for engaging the internal toothing (5) of the internal gear (3); and
a drive-input element having a profiling (22) for radial drive of the multiplicity of teeth (7);
a drive output shaft (25) which is driven by the coaxial gearing (20), the drive output shaft (25) passing through the hollow shaft (15) and having a drive-output end (26) for driving a load (70) and a non-drive-output end (27) opposite from the drive-output end (26); and
a gearing rotary encoder (30) which is connected to the drive output shaft (25) of the gearing on the non-drive output end (27), wherein the gearing rotary encoder (30) is arranged and configured to detect a drive-output angular position of the drive output shaft (25) of the gearing and to output the drive-output angular position as a drive-output angle signal (δ), wherein the gearing rotary encoder (30), the commutated electric motor (10), the coaxial gearing (20), and the load (70) are positioned along the drive output shaft (25), in that order, from the non-drive-output end (27) to the drive-output end (26).

2. The drive according to claim 1, wherein the gearing (20) and the electric motor (10) are connected to one another by way of the hollow shaft (15) for the transmission of a drive torque of the electric motor (10).

3. The drive according to claim 1, wherein the teeth (7) of the gearing (20) are guided in each case at least one of radially or linearly in the tooth carrier (11).

4. The drive according to claim 1, wherein the drive-input element comprises a cam disk (21).

5. The drive according to claim 1, further comprising:
a commutation device (40) for the electric motor (10), wherein the commutation device (40) is configured to determine, from the drive-output angle signal (δ), a calculated rotor angular position of the electric motor (10) and to generate a commutation signal (k), containing a setpoint torque signal, for the electric motor (10) using the calculated rotor angular position.

6. The drive according to claim 5, wherein the commutation device (40) is further configured to:
determine an estimated angular position deviation value between the calculated rotor angular position and an estimated rotor angular position from the setpoint torque signal and from a rigidity of the gearing (20);
determine a corrective signal for the rotor angular position from the deviation value; and
superpose the corrective signal on the commutation signal.

7. The drive according to claim 6, wherein the commutation device (40) is further configured to:
estimate an estimated rotor angular position of the electric motor (10) from a measured back-EMF;

determine an angular position deviation value between the calculated rotor angular position and the estimated rotor angular position; and determine a drive output torque from the rotational angle position deviation value and from the rigidity of the gearing.

8. The drive according to claim 1, wherein a rotational degree of freedom of the teeth (7) relative to the tooth carrier (11) about the longitudinal axis of the gearing (1) is blocked.

9. The drive according to claim 1, further comprising:
a commutation device (40) for the electric motor (10), wherein the commutation device (40) is configured to determine, from the drive-output angle signal (δ) and from a transmission ratio of the coaxial gearing (20), a calculated rotor angular position of the electric motor (10) and to generate a commutation signal (k) for the electric motor (10) using the calculated rotor angular position.

10. The drive according to claim 1, wherein the commutated electric motor (10) is free of a motor rotary encoder.

11. A method for operating a drive comprising:
a commutated electric motor (10) having a drive-output side (B), a non-drive-output side (A) and a hollow shaft (15) at the drive-output side (B), the hollow shaft (15) being driven by the motor (10);
a coaxial gearing (20) which is driven by the hollow shaft (15), the coaxial gearing comprising:
an internal gear with an internal toothing (5);
a tooth carrier (11);
a multiplicity of teeth (7) received within the tooth carrier (11) and radially displaceable relative to the tooth carrier (11) in a longitudinal direction of the teeth (7) for engaging the internal toothing (5) of the internal gear (3); and
a drive-input element having a profiling (22) for radial drive of the multiplicity of teeth (7);
a drive output shaft (25) which is driven by the coaxial gearing (20), the drive output shaft (25) passing through the hollow shaft (15) and having a drive-output end (26) for driving a load (70) and a non-drive-output end (27) opposite from the drive-output end (26); and
a gearing rotary encoder (30) which is connected to the drive output shaft (25) of the gearing on the non-drive output end (27), wherein the gearing rotary encoder (30) is arranged and configured to detect a drive-output angular position of the drive output shaft of the gearing and to output the drive-output angular position as a drive-output angle signal (δ), wherein the gearing rotary encoder (30), the commutated electric motor (10), the coaxial gearing (20), and the load (70) are positioned along the drive output shaft (25), in that order, from the non-drive-output end (27) to the drive-output end (26), the method comprising the steps of:
detecting the drive-output angular position on the drive-output side (B) of the coaxial gearing (20);
calculating a calculated rotor angular position of the electric motor (10) from the detected drive-output angular position and from a transmission ratio of the coaxial gearing (20); and
providing a commutation signal (k) for the electric motor (10) using the calculated rotor angular position.

12. The method according to claim 11, wherein the commutation signal (k) contains a setpoint torque signal, and further comprising the steps:
determining an estimated angular position deviation value between the calculated rotor angular position and an estimated rotor angular position from the setpoint torque signal and from the rigidity of the gearing (20);
determining a corrective signal for the rotor angular position from the deviation value; and
superposing the corrective signal on the commutation signal.

13. The method according to claim 12, further comprising the steps:
measuring a back-EMF at an exciter coil of the electric motor (10);
estimating an estimated rotor angular position of the electric motor (10) from the back-EMF;
determining an angular position deviation value between the calculated rotor angular position and the estimated rotor angular position; and
determining a drive output torque from the rotational angle position deviation value and from the rigidity of the gearing.

14. The method according to claim 13, wherein the calculated rotor angular position and/or the estimated rotor angular position are determined without using a motor rotary encoder.

* * * * *